Aug. 30, 1932.  G. L. SMITH  1,874,131
AUTOMATIC SLACK ADJUSTER
Filed Jan. 10, 1930
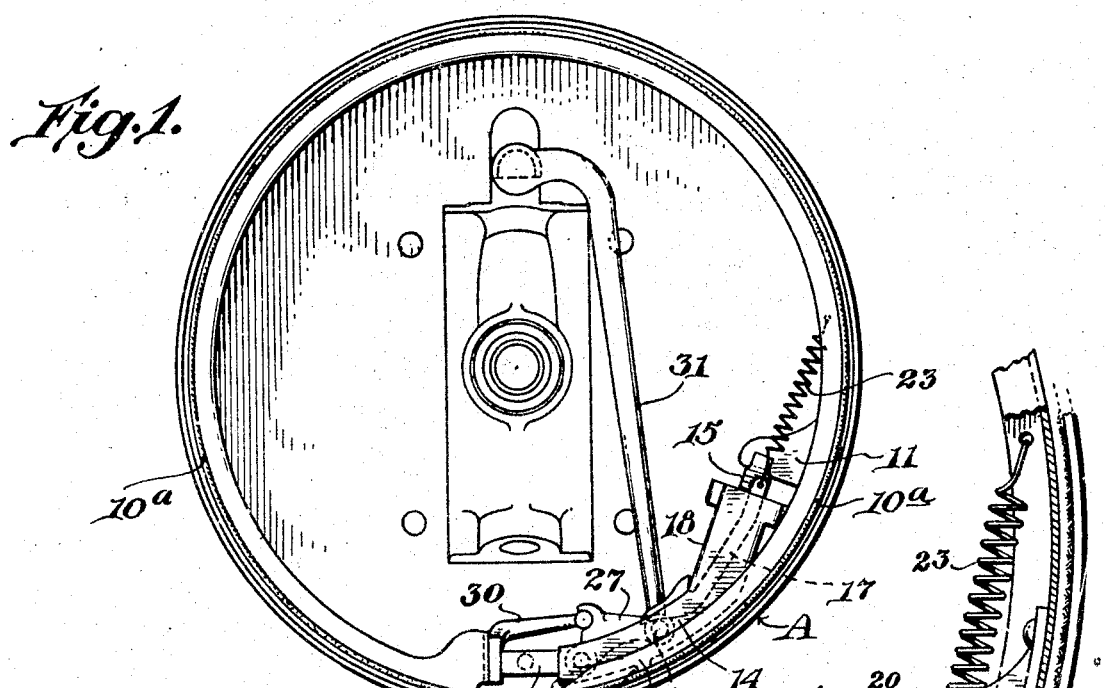
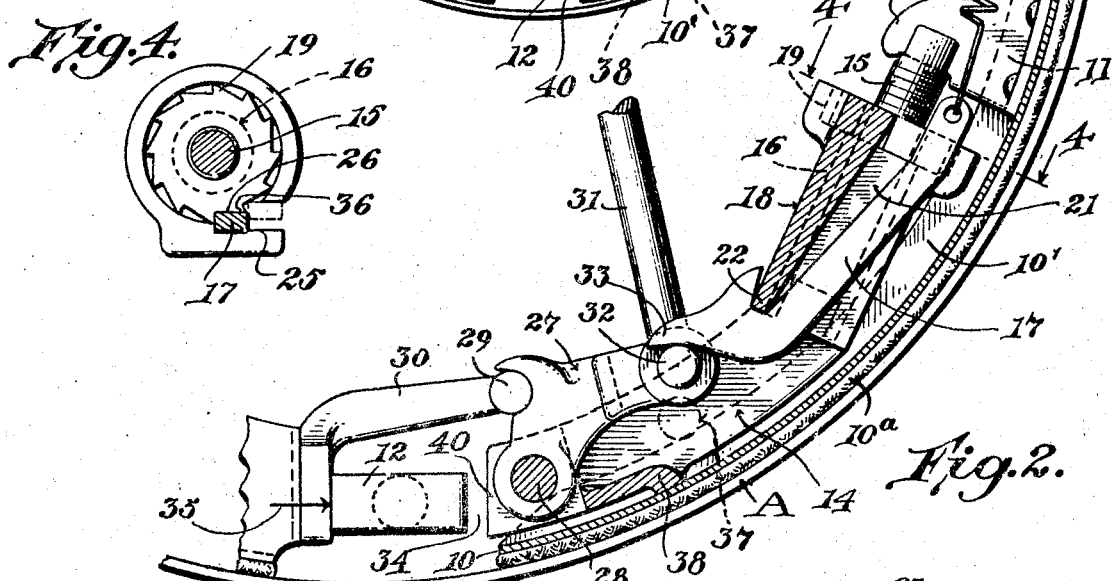
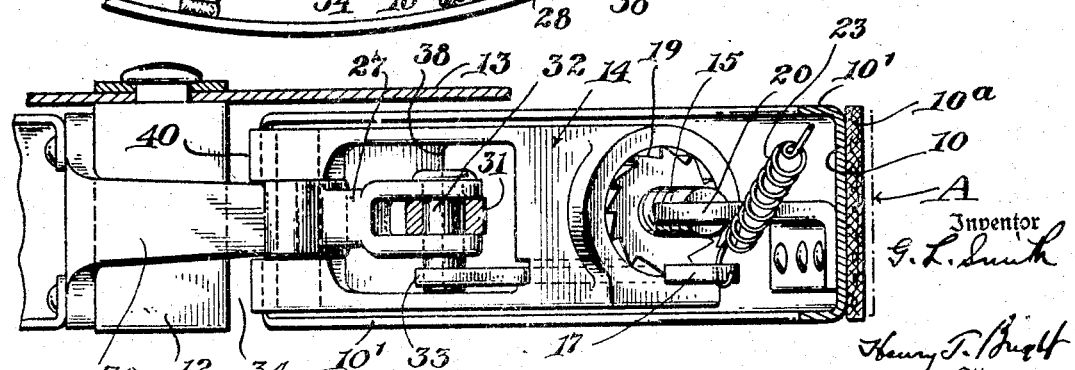

Patented Aug. 30, 1932

1,874,131

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA

AUTOMATIC SLACK ADJUSTER

Application filed January 10, 1930. Serial No. 419,302.

My invention relates to automatic slack adjusters for vehicle brakes and particularly to the type shown and described in my copending application serially numbered 362,534.

Particularly it is the purpose of my present invention to provide an improved construction for automatically increasing the over all length of an internal expanding full wrap brake band as the brake lining wears and thus in turn to maintain the movement of the brake applying device substantially uniform for proper brake application, regardless of wear of the brake lining.

My invention, when two brakes are equipped therewith and connected by the torque operated braking effect equalizing mechanism of the type described and claimed in my patents numbered 1,440,842 and 1,490,642 also serves the purpose of maintaining the movements of such equalizing mechanism within allowable limits regardless of the wear of the bands of the brakes connected thereby.

To this end I specifically employ an extensible screw device mounted on the inner face of the band at one end of the latter and movable along said inner face as the device is extended; the operation of said device being automatically accomplished by mechanism included therein and operated to effect the desired extension during release of the brake following a brake application wherein the elements of the brake applying device have moved a distance in excess of a predetermined amount; said operating mechanism of the extension device also including means to positively lock the same against any operative movement so long as the distance of movement of the brake applying device during brake application is within predetermined limits, to thereby provide against the extension device being jarred out of adjustment by the vibration of an associated vehicle during travel of the latter.

In the drawing chosen to illustrate my invention, the scope whereof is set forth in the appended claims, Figure 1 is a side elevation of an internal expanding brake having my invention incorporated, the brake being shown released;

Figure 2, an enlarged view of a fragment of Figure 1 showing the extension device of Figure 1 showing the extension device partly in section and with the brake applied under wear conditions requiring brake applying movement of the brake applying device beyond a predetermined extent;

Figure 3, a plan view of Figure 2; and

Figure 4, a section on the line 4—4 of Figure 2 with the brake released.

In the drawing I have shown my invention incorporated in an internal expanding brake which embodies a drum A within which is a full wrap expanding braking member 10 having side flanges 10' and the usual lining 10ª for braking engagement with the drum A. Mounted on the inner face of the member 10 is an inwardly directed thrust bracket 11, while an anchor 12 located between the ends of the member 10 is fixed to a non-rotating part of the brake, in the present instance the backing plate 13. To increase the effective length of the braking member 10 and thereby compensate for wear of the brake lining 10ª, I introduce between the thrust bracket 11 and anchor 12 my automatic slack adjuster which is shown as including a body 14, an adjusting screw 15, an adjusting sleeve 16 and an operating lever 17. The cylindrical shaped end 18 of the body 14 is bored out to snugly and rotatably receive the sleeve 16. Said sleeve 16 is threaded and takes the screw 15, and has fixedly associated with the end thereof adjacent the bracket 11 a twelve tooth ratchet 19. The outer end of the screw 15 is slotted to straddle the flange 20 of the thrust bracket 11 and said flange is recessed as shown to prevent the screw from sliding off the flange.

At one side of the sleeve 16 a slot 21 is cut in the body 14 and the lever 17 operates in this slot. One end of said lever is hooked over the inner end 22 of the cylindrical portion 18 of the body 14 and its other end is connected to a spring 23, which latter is anchored to the braking member 10 and constantly tends to pivot the lever 17 in a counter-clockwise direction (Figure 2) and also constantly tends to pull said lever laterally toward the ratchet 19 as clearly shown by the direction of the spring axis in Figure 3.

The brake member 10 is expanded by a lever 27 pivoted at 28 to the body 14, said lever also engaging pivotally the end 29 of an arm 30 rigidly secured to the opposite end of the braking member 10. The lever 27 is pivotally connected to a link 31 and the latter is to be connected in any suitable manner with a brake pedal or lever not shown. The pivotal connection between lever 27 and link 31 is in the form of a pin 32 which is extended sufficiently at one end to be positioned under the adjacent end 33 of the lever 17.

In Figure 4 I have shown the lever 17 in section in the position it occupies when the brake is fully released and in which position it fits snugly between the side 25 of slot 21 and the side 26 of the adjacent ratchet tooth of the ratchet 19 and whereby the sleeve 16 is normally held by the lever 17 against rotation in either direction. When the brake is applied by a movement of the brake applying means in excess of a predetermined amount the lever 17 is rotated down to the dotted position shown in Fig. 4 by the pressure of pin 32 on the end 33 and is swung to the right under the next ratchet tooth by the action of the spring 23 as heretofore referred to.

In Figures 2 and 3 the parts are shown in the positions they would occupy when the brake is applied under wear conditions requiring movement of the lever 27 beyond a predetermined amount and during such application or any normal application of the brake when the drum A is rotating in response to forward movement of an associated vehicle a gap 34 occurs between the anchor 12 and body 14 and the thrust of the braking member 10 comes on anchor 12 as shown by the arrow 35. Figure 2 also discloses that the pin 32 has operated lever 17 by pivoting it in a clockwise direction, so that it has moved down and to the side as shown in dotted lines in Figure 4 and has picked up the tooth 36 on ratchet 19.

With the status shown in Figures 2 and 3 existing it will be apparent that as the brake is released the pin 32 will move from the full line position to the dotted line position 37. During this movement the gap 34 closes and the spring 23 operates to return the lever 17 to the full line position in Figure 4, thereby rotating the ratchet 19 and its associated sleeve 16 the distance of one tooth, thus causing the sleeve 16 to screw out on screw 15. This increases the effective length of the braking member 10 and thereby adjusts it to a position nearer the brake drum A. This rotation or turning of the sleeve 16 will continue for each application of the braking member until the latter is expanded sufficiently to make positive and proper contact with the brake drum before the pin 32 has operated the lever 17 sufficiently to cause said lever to pick up the next tooth of ratchet 19.

To permit free movement of the body 14 along the braking member as the screw 15 is traversed out I provide on the body 14 a foot 38 to rest against the member and force it outwardly when the brake is applied, but without interfering with the slight angular movement of body 14 with respect to the braking member caused by the rectilinear movement of the screw 15. The side flanges 10' of the braking member also act as guides for the body 14 and prevent any lateral movement of said body. It will also be noted that the thrust of the brake when resisting backward movement of the vehicle will be imparted to the anchor 12 by the end 40 of body 14 and from that through screw 15 and the thrust bracket 11 to the brake member 10. In such case the gap 34 would appear on the left side of anchor 12.

It will be noted that the upward movement of link 31 beyond a certain amount causes the ratchet lever 17 to pick up a new tooth on the ratchet 19, but that the turning of sleeve 16 to extend the screw 15 does not take place until brake is released and the pressure on the various parts is relieved, and further noted that the only interval when sleeve 16 is not locked against turning is when lever 17 is in the position shown in dotted lines in Fig. 4 and this is at a time when the brake is applied and the parts under pressure to prevent any rotative movement of said sleeve 16. As soon as the brake is released the spring 23 immediately acts to rotate the sleeve to a locked position again.

It will be further noted that the body 14 of the extensible compression device is in contact through foot 38 with the inner face of the band 10 and along which inner face it is adapted to be automatically extended as heretofore described. This contact of the body 14 with the inner face of the band 10 is an important feature of my invention. By this construction and arrangement the body 14 will, during brake application, be heated up rapidly by the band and expand with the latter, so that the take-up action will not work too fast as the band follows the heat produced expanding action of the drum. Were it not for this substantially uniform heating up of the band and the compression device due to contact between the band and the body 14 a too quick take-up action would occur, and the band being inside the drum and accordingly slower in cooling than the drum, an interval would occur when the brakes would be inclined to drag.

While I have illustrated and described my invention as incorporated with a braking member of the full wrap internal expanding type, it will be apparent that the same is also applicable to other types of braking members without in any manner departing from the spirit thereof and I have accordingly claimed my invention with such intent and scope.

I claim:

1. In a brake, a braking member, an extensible device through which braking force is transmitted to the braking member, means for applying braking force to the braking member through said device, said last named means including a lever pivoted to the device, a member movable in one direction by brake applying movement of said lever, spring means for moving said member in the opposite direction during the following brake release, and means operated by the latter movement of the member to extend said device when said first movement is of predetermined extent.

2. In a brake, a brake member, brake applying means, and an automatically extensible compression device operatively connected with the brake applying means, said device including a body, a rotatable ratchet and an operating lever for the latter positioned when the brake is released to lock the ratchet against rotation in one direction by engagement with a ratchet tooth and against rotation in the opposite direction by simultaneous engagement of opposite portions of the lever with one side of the next tooth of the ratchet and the body respectively.

3. In a brake, a braking member, a thrust member carried by the brake, an extensible device one end of which bears against the thrust member, means for applying braking force to the braking member through said device and thrust member, said last named means including a lever pivoted to the device, a second lever on said device movable in one direction by brake applying movement of the first lever, a spring operating to move said second lever in the opposite direction during the following brake release and also constantly urging the extensible device against the thrust member through said second lever, and means operated by the latter movement of the second lever to extend said device when the first movement of the second lever is of predetermined extent.

4. In a brake, a brake member, brake applying means, a brake adjusting device operable by a predetermined amount of brake applying movement of the brake applying means and having two movements of adjustment, and means positively locking said device against either adjusting movement during both idle status of the brake and during movement of the brake applying means within predetermined limits.

5. In a brake, a brake member, a brake applying means, and an automatically extensible compression device operatively connected with the brake applying means, said device including a rotatable ratchet and an operating lever therefor positioned when the brake is released to lock the ratchet against rotation in either direction.

6. In a brake, a brake member, brake applying means, an automatically extensible compression device operatively connected with the brake applying means, said device including a body, a rotatable sleeve carried by the body, a non-rotatable screw on which the sleeve is threaded, a circumscribing ratchet fixed to the sleeve, a lever carried by the body and operable by the brake applying means during brake application, and means operable upon predetermined brake applying movement of the brake applying means to cause said lever to pick up an advance tooth of the ratchet and rotate the sleeve as the brake is released, said lever cooperating with said ratchet when the brake is fully released to lock the sleeve against rotation in either direction.

In testimony whereof I hereunto affix my signature.

GEORGE L. SMITH.